United States Patent
Nilsson et al.

(10) Patent No.: US 9,838,173 B1
(45) Date of Patent: Dec. 5, 2017

(54) METHOD AND APPARATUS FOR TRANSMISSION IN A WIRELESS COMMUNICATION NETWORK

(71) Applicant: Telefonaktiebolaget LM Ericsson (publ), Stockholm (SE)

(72) Inventors: Thomas Nilsson, Malmö (SE); Dzevdan Kapetanovic, Lund (SE); Leif Wilhelmsson, Dalby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/369,307

(22) Filed: Dec. 5, 2016

(51) Int. Cl.
| | |
|---|---|
| H04L 5/06 | (2006.01) |
| H04L 5/00 | (2006.01) |
| H04W 72/04 | (2009.01) |
| H04W 72/12 | (2009.01) |

(52) U.S. Cl.
CPC ........... H04L 5/001 (2013.01); H04W 72/044 (2013.01); H04W 72/12 (2013.01)

(58) Field of Classification Search
CPC ..... H04L 5/001; H04L 5/023; H04L 27/2601; H04L 27/362; H04W 72/12; H04W 72/044
USPC .......................... 375/259, 260, 285, 295, 296
See application file for complete search history.

(56) References Cited

U.S. PATENT DOCUMENTS

| | | | |
|---|---|---|---|
| 2005/0281292 A1 | 12/2005 | Troulis et al. | |
| 2010/0303168 A1 | 12/2010 | Xia | |
| 2011/0064041 A1* | 3/2011 | Hooli | H04L 5/0007 370/329 |
| 2013/0223301 A1* | 8/2013 | Lee | H04W 72/042 370/281 |
| 2014/0334420 A1 | 11/2014 | You et al. | |
| 2015/0264161 A1* | 9/2015 | Tian | H04L 69/22 370/338 |
| 2017/0111875 A1* | 4/2017 | Azizi | H04W 56/001 |
| 2017/0118315 A1* | 4/2017 | Sun | H04L 69/22 |
| 2017/0135110 A1* | 5/2017 | Rajakarunanayake | H04W 72/0453 |

FOREIGN PATENT DOCUMENTS

| | | |
|---|---|---|
| WO | 2015138685 A1 | 9/2015 |
| WO | 2016033386 A1 | 3/2016 |
| WO | 2016126389 A1 | 8/2016 |

* cited by examiner

*Primary Examiner* — Siu Lee

(74) *Attorney, Agent, or Firm* — Murphy, Bilak & Homiller, PLLC

(57) ABSTRACT

A node in a wireless communication network uses a modified data-to-subcarrier mapping on at least a selective basis, wherein the modified mapping effectively extends the cyclic prefix (CP) of a transmission targeted to a given receiver without extending the CP of the Orthogonal Frequency Division Multiplex (OFDM) symbol in which the transmission is conveyed. This approach allows, for example, the node to use a first or normal data-to-subcarrier mapping for transmissions that are targeted to receivers that do not need an effective increase of the CP length, while using the modified mapping for those receivers that need a longer effective CP length, e.g., because of receiver type or channel conditions.

26 Claims, 9 Drawing Sheets

FIRST MAPPING

SECOND MAPPING

EXAMPLE VARIANT OF CO-SCHEDULING
RECEIVERS FROM THE FIRST AND
SECOND CATEGORIES

EXAMPLE VARIANT OF CO-SCHEDULING
RECEIVERS FROM THE FIRST AND
SECOND CATEGORIES

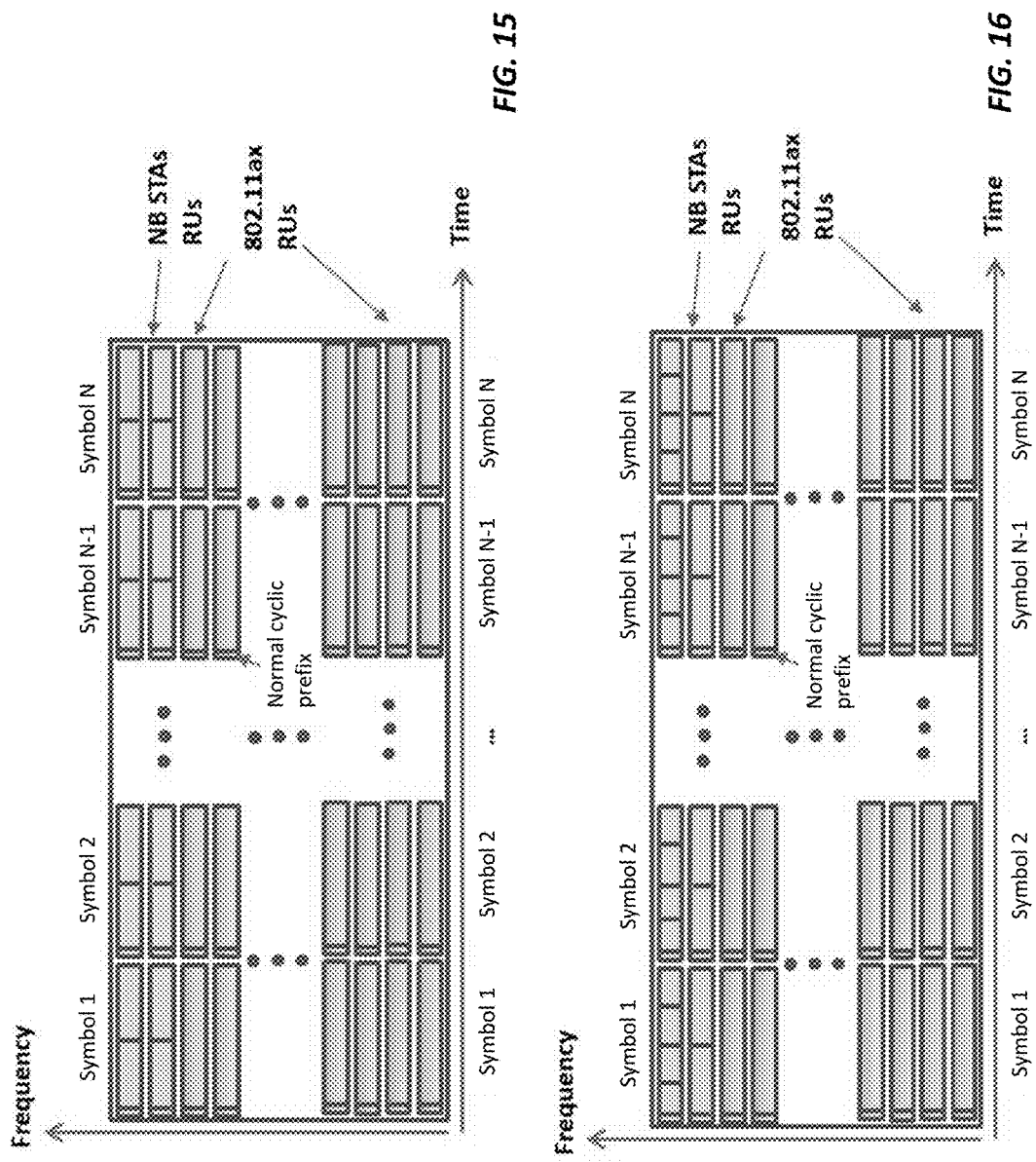

METHOD AND APPARATUS FOR TRANSMISSION IN A WIRELESS COMMUNICATION NETWORK

TECHNICAL FIELD

The present invention generally relates to wireless communication networks, and particularly relates to transmitting in wireless communication networks.

BACKGROUND

Several technologies that today predominantly support very high data rates are not well suited for IoT (Internet of Things), Energy Management, and Sensor applications. For this reason, several standardization development organizations like the Third Generation Partnership Project (3GPP) and the Institute of Electrical and Electronics Engineers (IEEE) are developing flavors of their mainstream technology that are optimized to support communication at longer range, but at lower data rates and, preferably, using less power consumption.

Recent interest has focused on so-called Long Range Low Power (LRLP) devices. As suggested by its name, LRLP devices are intended for operation at longer ranges and/or lower power than would be considered "normal" in the context of existing standards. LRLP is expected to be based on technologies and features found in IEEE 802.11ax, which is currently being standardized. That standardization is expected to accelerate the time to market for future LRLP products. One can imagine that access points supporting 802.11ax also have support for LRLP. Good coexistence between LRLP and 11ax devices will thus be important. A LRLP device, referred to as a "STA" or "station" in the standards jargon, is expected to operate on a much lower bandwidth (e.g. 2 MHz) as compared to the "legacy" 802.11 minimum bandwidth of 20 MHz. LRLP devices may be considered as belonging to a larger, or more general group of devices referred to as "narrow band Wi-Fi."

In 802.11ax, a tone plan has been set for the new Fast Fourier Transform (FFT) size of 256, which is four times the size of the legacy FFT size. The smallest allocated sub band, called a resource unit or "RU," consists of twenty-six subcarriers. Each RU contains two pilot tones. The largest tone unit for 20 MHz contains 234 tones and 8 pilot tones. There are many more tone unit sizes for different bandwidths. This tone plan is required for resource allocation with OFDMA in uplink and downlink.

It is recognized herein that certain challenges arise in an environment where both 802.11ax STAs and LRLP STAs are to be served. More generally, it is recognized herein that the same or similar challenges arise whenever a wireless access point must support devices intended to operate at longer distances and/or lower powers than are considered "normal" for the involved air interface standard.

As an example, LRLP STAs may have substantially different cyclic-prefix length requirements than 802.11ax STAs on the downlink. For example, a LRLP STA far from the involved wireless access point may require a much longer cyclic prefix than is required by an 802.11ax STA operating relatively close to the wireless access point. One solution is to use a long cyclic prefix for all the sub bands in the OFDMA transmission. However, this approach increases the overhead and therefore wastes capacity and it is not possible to use different lengths of cyclic prefixes in the same OFDMA symbol without causing inter symbol interference (ISI).

Another problem with co-scheduling LRLP and 802.11ax STAs in an OFDMA fashion in the downlink is the need of a narrowband preamble. There is no simple way for an LRLP STA to use parts of the legacy preamble of 20 MHz to perform time and frequency synchronization.

Because LRLP STAs only support lower bandwidths and need to filter out their allocated sub bands, e.g., an allocated 2 MHz sub band within a 20 MHz OFDMA signal. That operation is a difficult problem to achieve if an LRLP STA samples at a much lower rate than 20 MHz. Any receive filter applied to an OFDM signal will effectively shorten the cyclic prefix due to the variations in the group delays of the applied filters, which may introduce ISI in the signal.

SUMMARY

A node in a wireless communication network uses a modified data-to-subcarrier mapping on at least a selective basis, wherein the modified mapping effectively extends the cyclic prefix (CP) of a transmission targeted to a given receiver without actually extending the CP of the Orthogonal Frequency Division Multiplex (OFDM) symbol in which the transmission is conveyed. That is, the second mapping allows for a larger channel delay spread to be handled without suffering from Inter-Symbol Interference (ISI), as compared to the common cyclic prefix, for data transmitted using the second mapping. This approach allows, for example, the node to use a first or normal data-to-subcarrier mapping for transmissions that are targeted to receivers that do not need an effective increase of the CP length, while using the modified mapping for those receivers that need a longer effective CP length, e.g., because of receiver type or channel conditions.

In an example embodiment, a method of transmission performed by a network node in a wireless communication network includes allocating a first resource unit to a first receiver and a second resource unit to a second receiver. Each resource unit has the same subcarrier spacing, and the node performs the allocating operations with respect to one or more OFDM symbol durations of an OFDM signal.

The method further includes applying a first mapping for mapping data to be transmitted to the first receiver, where the first mapping considers every subcarrier of the first resource unit as being available for mapping the data for the first receiver to the first resource unit, and applying a second mapping for mapping data to be transmitted to the second receiver, where the second mapping considers only every m-th subcarrier of the second resource unit as being available for mapping the data for the second receiver to the second resource unit. The value in is an integer greater than or equal to two, and the second mapping includes mapping zeros to the remaining subcarriers of the second resource unit. The method further includes generating the OFDM signal from the mapped data for the first and second receivers, and transmitting the OFDM signal. The OFDM signal comprises an OFDM symbol for each of the one or more OFDM symbol durations, with each OFDM symbol having a commonly defined CP length.

In another example embodiment, a network node is configured for operation in a wireless communication network and includes communication circuitry configured for transmitting to receivers operating in the network, along with processing circuitry that is operatively associated with the communication circuitry. The processing circuitry is configured to allocate a first resource unit to a first receiver and a second resource unit to a second receiver. Each resource unit has the same subcarrier spacing, and the allocation is performed with respect to one or more OFDM symbol durations of an OFDM signal.

The processing circuitry is further configured to apply a first mapping for mapping data to be transmitted to the first receiver, where the first mapping considers every subcarrier of the first resource unit to be available for use when mapping the data for the first receiver to the first resource unit, and apply a second mapping for mapping data to be transmitted to the second receiver, where the second mapping considers only every m-th subcarrier of the second resource unit to be available for use when mapping data for the second receiver to the second resource unit. The value m is an integer greater than or equal to two, and the second mapping maps zeros to the remaining subcarriers of the second resource unit.

Still further, the processing circuitry is configured to generate the OFDM signal from the mapped data for the first and second receivers, and transmit the generated OFDM signal. The OFDM signal comprises an OFDM symbol for each of the one or more OFDM symbol durations, and each OFDM symbol has a commonly defined CP length.

In another example embodiment, a computer-program product comprises computer code that, when executed by processing circuitry of a network node operating in a wireless communication network, causes the network node to allocate a first resource unit to a first receiver and a second resource unit to a second receiver. Each resource unit has the same subcarrier spacing, and the allocating operations are performed with respect to one or more OFDM symbol durations of an OFDM signal.

The computer code further comprises instructions causing the network node to apply a first mapping for mapping data to be transmitted to the first receiver, where the first mapping considers every subcarrier of the first resource unit as being available for mapping the data for the first receiver to the first resource unit, and to apply a second mapping for mapping data to be transmitted to the second receiver, where the second mapping considers every m-th subcarrier of the second resource unit as being available for mapping the data for the second receiver to the second resource unit. The value m is an integer greater than or equal to two, and the second mapping maps zeros to the remaining subcarriers of the second resource unit.

Still further, the computer code includes program instructions causing the network node to generate and transmit the OFDM signal. The OFDM signal is generated from the mapped data for the first and second receivers and it comprises an OFDM symbol for each of the one or more OFDM symbol durations, where each OFDM symbol has a commonly defined CP length.

In yet another embodiment, a method of transmission is performed by a network node in a wireless communication network and includes forming an OFDM symbol having a defined CP length, and transmitting the OFDM symbol in a corresponding OFDM symbol duration. Here, forming the OFDM symbol includes mapping data for a first receiver to a first resource unit allocated to the first receiver for the OFDM symbol duration, and mapping data for a second receiver to a second resource unit allocated to the second receiver for the OFDM symbol duration.

The first and second resource units have the same subcarrier spacing but do not necessarily include the same number of subcarriers. The first mapping considers every subcarrier of the first resource unit as being available for use when mapping the data for the first receiver to the first resource unit. However, the second mapping considers only every m-th subcarrier of the second resource unit as being available for use when mapping the data for the second receiver to the second resource unit and it maps zeros to the remaining subcarriers of the second resource unit. The value m is an integer greater than or equal to two.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

FIGS. 15 and 16 are diagrams of example resource unit allocations and mappings.

DETAILED DESCRIPTION

Figure 1:
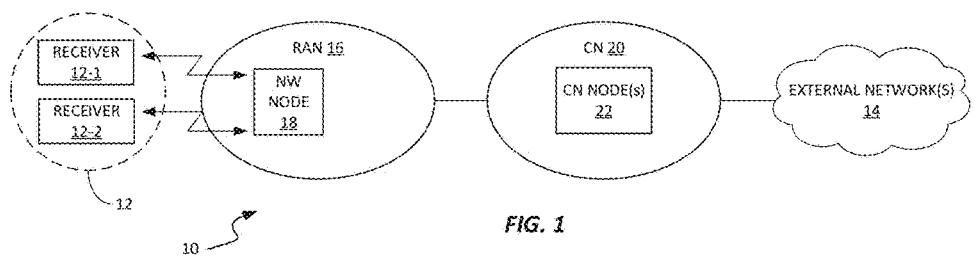
FIG. 1 is a block diagram of one embodiment of a wireless communication network that includes a network node.

FIG. 1 illustrates a wireless communication network 10 that provides one or more communication services to wireless communication devices referred to in this disclosure as "receivers." The reference number 12 generically refers to any given receiver or receivers, but there may be differences or distinctions between any two or more receivers 12, such as in terms of their types, capabilities, modes of operation, radio conditions, etc.

Broadly, such distinctions may be understood as different "categories" of receivers 12. e.g., receivers 12 in a first category may be of a certain type or class, or may fall within a first range of one or more radio conditions, while receivers 12 in a second category may be of another certain type or class or may fall within a second range of radio conditions. Where helpful in drawing such distinctions, this disclosure uses suffixing. Along those lines. FIG. 1 illustrates a first receiver 12-1 and a second receiver 12-2. By way of example, the first receiver 12-1 belongs to or is "deemed" to be in a first category of receivers 12 and the second receiver 12-2 belongs to or is "deemed" to be in a second category of receivers 12. The first receiver 12-1 may be a first type of wireless communication device and the second receiver 12-2 may be a second type of wireless communication device.

The network 10 may provide the same or different types of communication services to the first and second receivers 12-1 and 12-2. In a non-limiting example, the first receiver 12-1 comprises a Mobile Broadband (MBB) communication device, while the second receiver 12-2 comprises a Long Range Low Power (LRLP) device, such as an enhanced Machine Type Communication (eMTC) device. The network 10 connects the respective receivers 12-1 and 12-2 to other devices or systems within the network 10 or in one or more external networks 14, such as the Internet or another packet data network.

The receivers 12-1 and 12-2 connect to the network 10 via an air interface provided by a Radio Access Network (RAN) 16 of the network, which includes one or more network nodes 18, such as wireless access points, base stations, other types of radio network nodes. The radio link(s) from the RAN 16 to the devices 12 is referred to as the downlink, and the radio link(s) from the devices 12 to the RAN 16 is referred to as the uplink. The network 10 includes a Core Network (CN) 20, which includes one or more CN nodes 22. The CN 20 routes packet data into the RAN for downlink transmission to respective receivers 12, and routes packet data out of the RAN, as received via uplink transmissions from the receivers 12, either within the network 10 or out of the network 10 into the one or more external networks 14.

Figure 2:
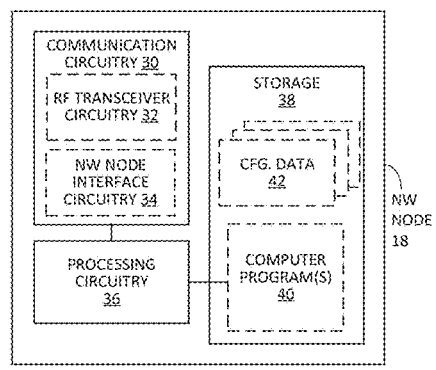
FIG. 2 is a block diagram of one embodiment of the network node introduced in FIG. 1.

FIG. 2 illustrates an example implementation of the network node 18, which is configured for operation in the network 10. The network node 18 includes communication circuitry 30 that is configured for transmitting to receivers 12 operating in the network 10, or at least those operating within radio coverage of the network node 18. For example, the communication circuitry 30 includes radio frequency (RF) transceiver circuitry 32 configured for transmitting on the downlink to the receivers 12 and for receiving on the uplink from the receivers 12. In one or more embodiments, the communication circuitry 30 also includes interface circuitry 34 for communicating with one or more other network nodes—e.g., other nodes within the RAN 16 and/or supporting nodes within the CN 20, such as a node 22 that provides packet gateway and/or mobility management functionality for receivers 12 supported by the network node 18.

The network node 18 further includes processing circuitry 36 that is operatively associated with the communication circuitry 30 and includes or is associated with storage 38. The processing circuitry 36 comprises fixed circuitry, or programmed circuitry, or a mix of fixed and programmed circuitry. In at least one embodiment, the processing circuitry 36 comprises one or more microprocessors, Digital Signal Processors (DSPs), Field Programmable Gate Arrays (FPGAs), Application Specific Integrated Circuits (ASICs), or other digital processing circuitry. In at least one such embodiment, the processing circuitry 36 is configured according to the teachings herein based on the execution of computer program instructions stored in one or more computer programs 40 held in storage 38 that is included in or associated with the processing circuitry 36. The storage 38 may further hold one or more items of configuration data 42 that is pre-provisioned and/or dynamically acquired by the processing circuitry 36.

In one or more embodiments, the storage 38 comprises one or more types of computer-readable media, such as a mix of non-volatile memory circuits or disk storage and volatile, working memory. Non-limiting examples of non-volatile storage include Solid State Disk (SSD) storage, FLASH, and EEPROM, while non-limiting examples of the volatile, working memory includes DRAM or SRAM.

However, implemented, the processing circuitry 36 is configured to control the network node 18 to make transmit Orthogonal Frequency Division Multiplex (OFDM) signals and, while not shown, the network node 18 shall be understood as having one or more transmit antennas and antenna-interface circuitry providing for such transmissions. For example, the processing circuitry 36 allocates one or more Resource Units (RUs) to one or more receivers 12 in each given scheduling interval, which may be Transmission Time Intervals (TTIs) or other units of time defined by the air interface. A RU comprises a certain number of OFDM subcarriers within a given OFDM symbol duration or time, where it will be appreciated that timing on the OFDM downlink can be understood as a succession of OFDM symbol times arranged in subframes, which are in turn arranged as frames.

Figure 3:
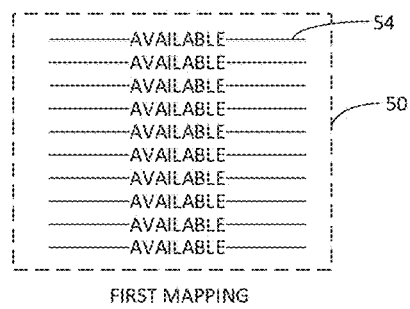
FIGS. 3 and 4 are block diagrams of one embodiment of first and second data-to-subcarrier mappings.
Figure 4:
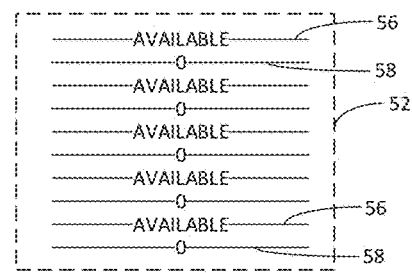

With the preceding signal structure details in mind and with reference to FIGS. 3 and 4, the processing circuitry 36 is configured to allocate a first resource unit 50 to a first receiver 12-1 and a second resource unit 52 to a second receiver 12-2. Each resource unit 50, 52 has the same subcarrier spacing and may or may not have the same total number of subcarriers. The allocations at issue here are performed for each of one or more OFDM symbol durations of an OFDM signal.

When making the allocations, the processing circuitry 36 is configured to apply a first mapping for mapping data to be transmitted to the first receiver 12-1, where the first mapping considers every subcarrier 54 of the first resource unit 50 to be available for use when mapping the data for the first receiver 12-1 to the first resource unit 50. Further when making the allocations, the processing circuitry 36 is configured to apply a second mapping for mapping data to be transmitted to the second receiver 12-2, where the second mapping considers only every m-th subcarrier 56 of the second resource unit 52 to be available for use when mapping data for the second receiver 12-2 to the second resource unit 52. Here, m is an integer greater than or equal to two, and the second mapping further includes mapping zeros to the remaining subcarriers 58 of the second resource unit 52.

The processing circuitry 36 is further configured to generate the OFDM signal from the mapped data for the first and second receivers 12-1, 12-2, where the OFDM signal comprises an OFDM symbol for each of the one or more OFDM symbol durations, each OFDM symbol having a commonly defined cyclic prefix length. It will be appreciated that an "OFDM symbol" comprises an overall set of subcarriers taken in a given OFDM symbol time, and it will be understood that an OFDM symbol may include transmissions for multiple receivers 12, e.g., may include multiple resource units targeting different receivers 12.

Still further, the processing circuitry 36 is configured to transmit the generated OFDM signal. It will be understood that the transmission and generation may be done substantially at the same time, i.e., the OFDM signal is transmitted in conjunction with its generation. Further, it should be appreciated that the allocations for the first receiver 12-1 and the second receiver 12-2 can be made in the same OFDM symbol duration(s) or in different OFDM symbol durations. That is, the OFDM signal as generated and transmitted in any given OFDM symbol duration may include the first and second RUs 50 and 52, or the processing circuitry 36 may send the first RU 50 in one OFDM symbol duration and send the second RU 52 in another OFDM symbol duration.

Figure 5:
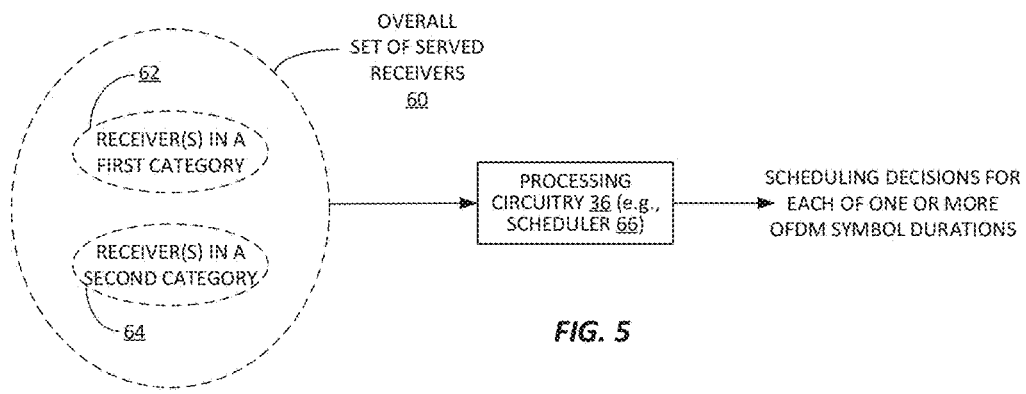
FIG. 5 is a block diagram of co-scheduling receivers in first and second categories.

Referring momentarily to FIG. 5, the network node 18 serves an overall set 60 of receivers, including at least the first and second receivers 12-1 and 12-2. The first receiver 12-1 belongs to a first category 62 of one or more receivers 12 being served by the network node 18, and the second receiver 12-2 belongs to a second category 64 of one or more receivers 12 being served by the network node 18. The processing circuitry 36 includes. e.g., a scheduler 66 that makes scheduling decisions for the OFDM symbol durations.

In an example instance or implementation, the processing circuitry 36 is configured to determine that the first mapping should be used for the first receiver 12-1 based on determining that the first receiver 12-1 belongs to the first category 62 of receivers 12, and determine that the second mapping should be used for the second receiver 12-2 based on determining that the second receiver 12-2 belongs to the second category 64 of receivers 12.

In some embodiments, the processing circuitry 36 is configured to determine that the first and second receivers 12-1, 12-2 belong to the first and second categories 62, 64 of receivers 12, respectively, by making the determinations from at least one of: receiver type indicators received from or for the first and second receivers 12-1, 12-2, maximum transmit power levels of the first and second receivers 12-1, 12-2, distances of the first and second receivers 12-1, 12-2 relative to the network node 18, channel conditions of the first and second receiver 12-1, 12-2 relative to the network node 18, and one or more receiver capabilities or constraints known for the first or second receivers 12-1, 12-2.

In one example, receivers 12 that require or prefer the second mapping may be configured to send in Information Element (IE), such as a flag, in their connection setup signaling and/or at any time they report capability information. Such information may be stored in context information within the network and passed along when the receiver 12 is handed over or otherwise moves from one serving network node 18 to another. Of course, it is also contemplated that a receiver may report its need or preference for the second mapping on an as-needed or triggered basis. Further, it should be appreciated that the need or preference for the second mapping may be signaled implicitly, in the sense that a receiver 12 may send type information and the network node 18 may be configured to infer from the type information that the second mapping and/or that a certain value of m should be used for the receiver 12.

Broadly, the processing circuitry 36 in one or more embodiments is configured to perform the allocating, applying, generating, and transmitting operations as part of scheduling receivers 12 of a first category 62 and receivers 12 of a second category 64. In the illustrated example, the first receiver 12-1 belongs to the first category 62 and the second receiver 12-2 belongs to the second category 64, and the processing circuitry 36 is configured to perform one of the following operations: (a) schedule one or more receivers 12 belonging to the first category 62 and one or more receivers 12 belonging to the second category 64 in the same OFDM symbol durations; and (b) schedule the one or more receivers 12 belonging to the first category 62 ("CAT-1") and the one or more receivers 12 belonging to the second category 64 ("CAT-2") in mutually exclusive OFDM symbol durations.

Figure 6:
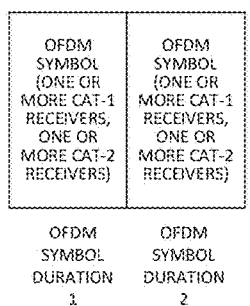
FIGS. 6 and 7 are diagrams of example variants or embodiments of co-scheduling, for receivers in first and second categories.
Figure 6:
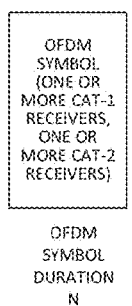
Figure 7:
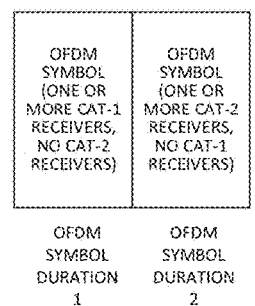
Figure 7:
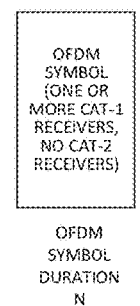

FIG. 6 illustrates the scheduling variant (a), wherein one or more CAT-1 receivers 12 are co-scheduled in the same OFDM symbol duration with one or more CAT-2 receivers, meaning that at least one RU 50 for a CAT-1 receiver 12 and at least one RU 52 for a CAT-2 receiver 12 are transmitted by the network node 18 in the same OFDM symbol on the downlink. FIG. 7 illustrates the scheduling variant (b), wherein CAT-1 and CAT-2 receivers 12 are not scheduled together in any OFDM symbol duration. Instead, in any given OFDM symbol duration, the processing circuitry 36 only schedules CAT-1 or CAT-2 receivers 12. The scheduling variant (b) can be understood as mutually exclusive scheduling of CAT-1 and CAT-2 receivers 12.

In an embodiment or instance where the network node 18 uses mutually exclusive scheduling, the processing circuitry 36 is configured to allocate first OFDM symbol durations on the downlink to CAT-1 receivers 12 and allocate second OFDM symbol durations on the downlink to CAT-2 receivers 12. In at least one such embodiment, the processing circuitry 36 is configured to determine the allocations of the first and second OFDM symbol durations in dependence on a communication load associated with the one or more receivers 12 belonging to the first category 62, in relation to the communication load associated with the one or more receivers 12 belonging to the second category 64.

"Load" may be assessed in terms of the number of receivers 12 belonging to the first category 62 and the number of receivers belonging to the second category 64. Additionally, or alternatively, "load" may be assessed based on aggregate data rates, such as average throughput for receivers 12 in the first and second categories. Still further, load may be assessed in terms of the involved communication services, such as reflected in minimum data rates or other QoS or criticality parameters. The load may be evaluated in relative terms. e.g., the first-category load as compared to the second-category load, but may also consider overall or absolute load at the network node 18, such as may be expressed in terms of receiver noise rise-over-thermal (RoT).

Notably, the second mapping allows for a larger channel delay spread to be handled without suffering from Inter-Symbol Interference (ISI), as compared to the common cyclic prefix, for the data to be transmitted to the second receiver 12-2, and the processing circuitry 36 in one or more embodiments is configured to decide to apply the second mapping for the data to be transmitted to the second receiver 12-2, instead of the first mapping, based on at least one of: channel conditions between the network node 18 and the second receiver 12-2; and receiver type or capability information known for the second receiver 12-2. The effective extension of the cyclic prefix length for the second receiver 12-2 can be varied over time, e.g., by increasing or decreasing the value of m. For example, changing from m=2 (every other subcarrier in an allocated RU available for data mapping) to m=3 (every third subcarrier in an allocated RU available for data mapping) increases the amount by which the cyclic prefix length of the overall OFDM symbol is effectively extended for data transmitted the second receiver 12-2.

Thus, although some embodiments are based on using a fixed value of m at least for a given receiver 12, other embodiments provide for varying the value of m over time with respect to a receiver 12, e.g., in dependence on changing radio conditions. Further, the processing circuitry 36 may not use the same value of m for all receivers 12 for which it is providing an effective extension of the common cyclic prefix length used for the OFDM symbols transmitted by the network node 18 on the downlink. Different receivers 12 may be compatible with different values of m, or may be associated with different receiver types or capabilities or constraints that map to different values of m. In one example, the processing circuitry 36 may use a first value of m for a receiver 12 having a first range of propagation path delay relative to the network node 18 and may use a greater, second value of m for another receiver having a greater, second range of propagation path delay.

Figure 8:
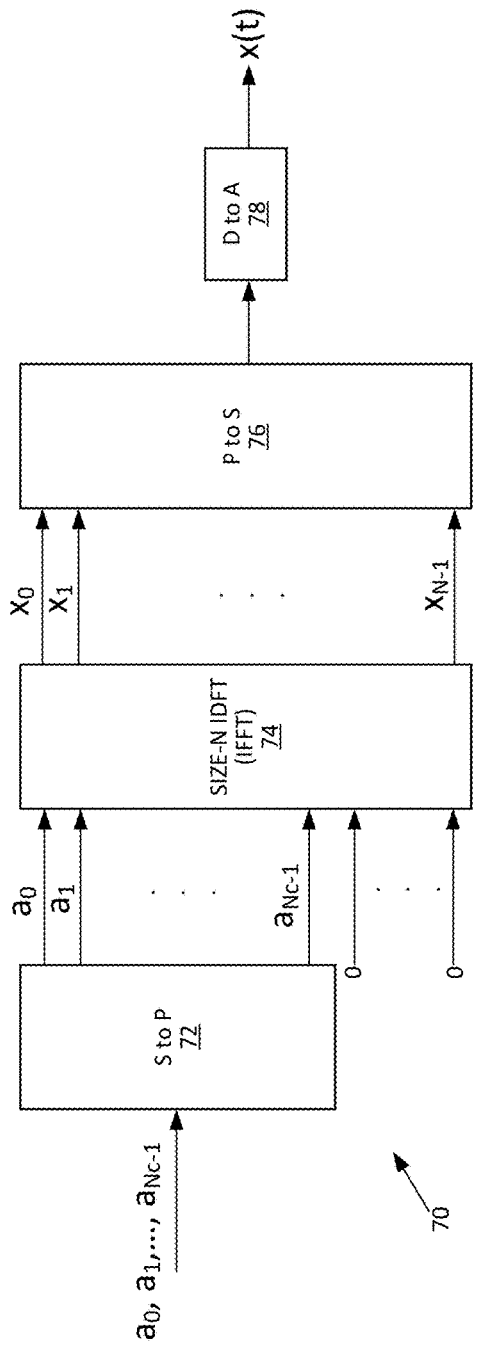
FIGS. 8 and 9 are block diagrams illustrating known OFDM signal generation operations.

To better appreciate such processing and the advantages flowing therefrom, consider FIG. 8 which illustrates a conventional approach to OFDM modulation. The illustrated OFDM modulation circuitry 70 includes a serial-to-parallel (S to P) converter circuit 72, a size-N Inverse Discrete Fourier Transform (IDFT) circuit 74, a parallel-to-serial (P to S) converter circuit 76, and a digital-to-analog (D to A) circuit 78.

A series of modulation symbols to be transmitted is input to the S to P converter 72, which outputs them as a parallel set of modulation symbols. The parallel set of modulation symbols is extended with zeros, as needed, to the length N of the IDFT implemented by the IDFT circuit 74. The IDFT circuit 74 outputs values x0, x1, and so on, corresponding to respective ones of the subcarriers comprising the overall OFDM signal, and these values are serialized via the P to S circuit 76 and the serialized values are converted to analog form in the time domain via the D to A circuit 78.

While the scheme depicted in FIG. 8 works in an idealized case, transmission of the resulting signal over time-dispersive channels results in a loss of orthogonality between the subcarriers, because the demodulation correlation interval for one propagation path will overlap with the symbol boundary of a different propagation path. Time dispersion causes both inter-symbol interference within a subcarrier and interference between subcarriers.

Figure 9:
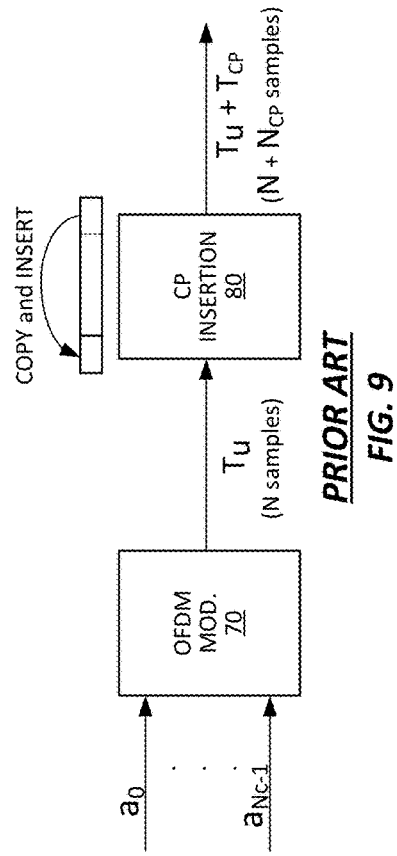

FIG. 9 illustrates a prior art approach to addressing time dispersive channels wherein the OFDM modulation circuitry 70 is associated with or includes a cyclic prefix (CP) insertion circuit 80, which inserts a cyclic prefix into the OFDM signal transmitted on the downlink in each OFDM symbol duration. That is, the last part of the overall OFDM symbol (all subcarriers) transmitted in each OFDM symbol duration is copied and inserted at the beginning of the OFDM symbol.

As seen in the diagrammed example, the OFDM symbol includes N samples corresponding to the N-size IDFT, and has a duration or length of Tu. The CP insertion circuit 80 copies a terminal portion of symbol, with the copied amount denoted as Tcp, and adds the copied portion to the front of the OFDM symbol as the cyclic prefix or CP. Addition of the CP increases the symbol duration to the length Tu+Tcp.

By generating OFDM symbols for downlink transmission in this manner, each such OFDM symbol has the same CP length or duration. Conventionally, the commonly applied CP length is sufficient for all receivers that might be served on the downlink. However, as noted in the background of this disclosure, newer service scenarios involve situations where some receivers may need longer CPs than others, which is problematic as the different CPs cannot be applied to the same OFDM symbol. That is, while a given OFDM symbol may include data for more than one receiver, only one CP can be applied to the overall symbol.

Figure 10:
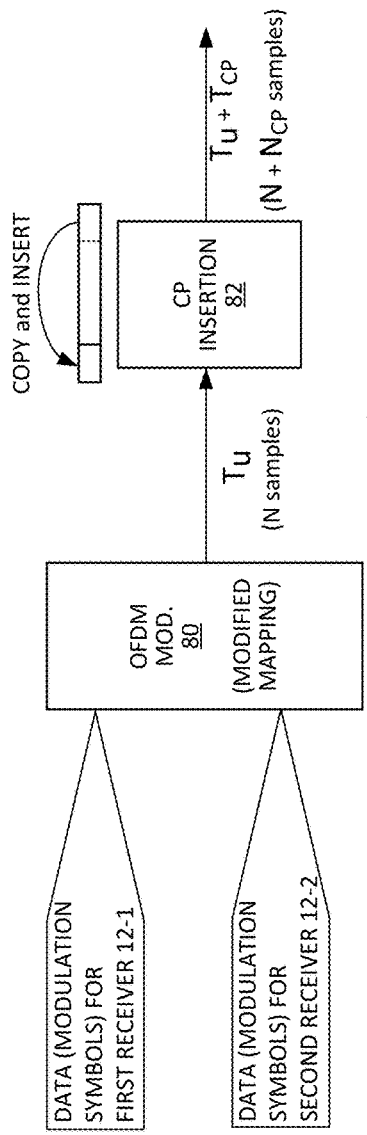
FIGS. 10 and 11 are block diagrams of one embodiment of a modified OFDM signal generation.

The network node 18 and its included processing circuitry 36 solve the aforementioned problem by selectively providing an "effective" extension of the CP length for individual receivers 12 or for groups of receivers 12. That is, while the network node 18 is configured to transmit downlink OFDM symbols having a commonly defined CP length, the CP length can be effectively lengthened for the data transmitted to individual ones of the receivers 12 being served by the network node 18, based on using the advantageous subcarrier mapping disclosed herein. FIG. 10 illustrates an example circuit configuration.

The processing circuitry 36 includes an OFDM modulation circuit 80 that implements a modified mapping. For any given receiver 12 being served by the network node 18, the OFDM modulation circuit 80 can use a first mapping or a second mapping. It may be that the first mapping represents a "default" choice and is used for any given receiver 12 unless or until the network node 18 determines that the second mapping should be used. Of course, it is also contemplated that the network node 18 receives or determines receiver type or capability information, e.g., at connection setup, and it may initialize one or the other mapping at the outset of connecting with a given receiver 12.

The first mapping—as was illustrated in FIG. 3—assumes that every subcarrier 54 in a RU 50 allocated to the receiver 12 in question is available for use. That is, data for transmission to the receiver can be mapped to any and all subcarriers 54 in the RU 50, up to the total number of subcarriers 54 included in the RU 50. Receivers 12 that are served with RUs based on the first mapping enjoy the "normal" or "default" CP length, based on the CP insertion performed by the CP insertion circuitry 82 shown in FIG. 10.

The second mapping—as was illustrated in FIG. 4—does not consider all subcarriers within an allocated RU to be available for use. Instead, for a RU 52 that is allocated for use with the second mapping, the second mapping only considers every m-th subcarrier 56 within the RU 52 to be available for use. The second mapping maps zeros to the remaining subcarriers 58. By imposing at least one zeroed subcarrier 58 between each subcarrier 56 used for data transmission within the RU 52, the effective length of the CP is extended.

Note that in this explanation and throughout this disclosure, a RU 50 used with the first mapping may be identical to a RU 52 used with the second mapping—i.e., the two RUs 50 and 52 may have the same number of subcarriers within them. However, use of the different reference numbers provides for a convenient distinction between RUs formed using the different mappings. Similarly, the subcarriers 54 in a RU 50 may be identical to the subcarriers 56 or 58 in a RU 52, but the different reference numbers provide for convenient distinction when discussing subcarriers subject to the first mapping, and when discussing subcarriers subject to the second mapping.

Figure 11:
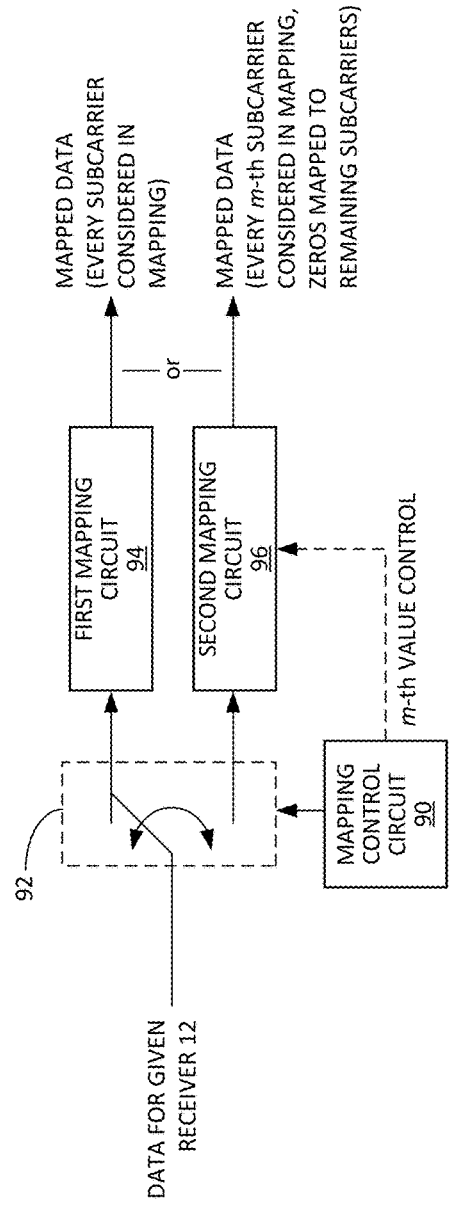

FIG. 11 illustrates a physical and/or functional circuit arrangement that may be implemented within the processing circuitry 36 with respect to individual receivers 12 being served by the network node 10. A mapping control circuit 90 operates on a "switch" 92 to control whether data to be transmitted on the downlink to a given receiver 12 is mapped by a first mapping circuit 94 per the first mapping described herein, or is mapped by a second mapping circuit 96 per the second mapping described herein. Additionally, in a least some embodiments, the mapping control circuit 90 controls the value of m used by the second mapping circuit 96.

Such mapping decisions can be made independently with respect to different receivers 12 and/or can be made repeatedly with respect to any given receiver 12, e.g., over time and in dependence on changing radio conditions. For example, the processing circuitry 36 may activate the second mapping when the performance—e.g., average Bit Error Rate or Block Error Rate—of a receiver 12 falls below a defined threshold. Of course, other metrics are contemplated for switching from the first mapping to the second mapping and/or for adjusting the value of m used in the second mapping.

Figure 12:
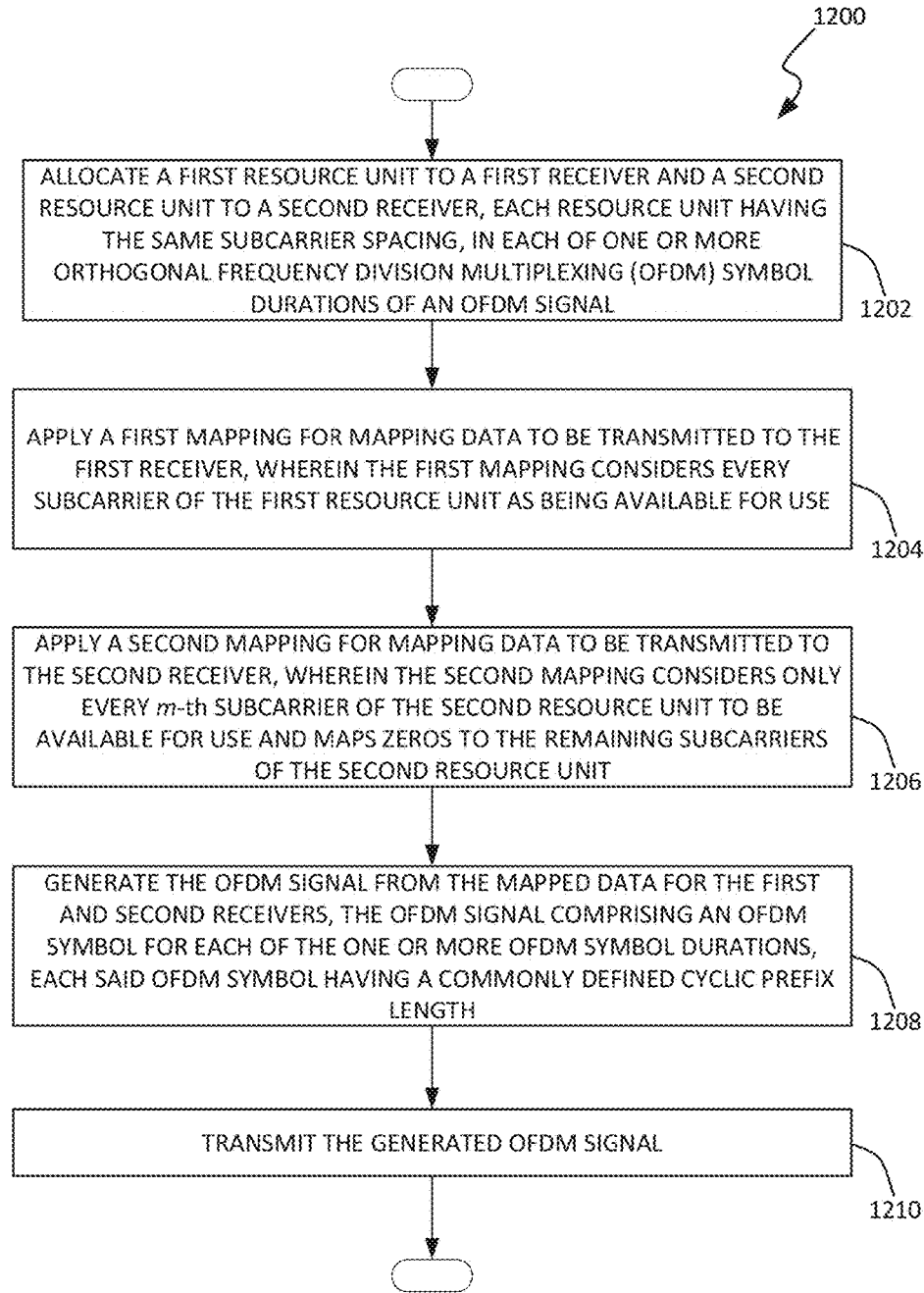
FIG. 12 is a logic flow diagram of one embodiment of a method of transmission in a wireless communication network.

FIG. 12 illustrates a method 1200 of processing, as may be implemented by the processing circuitry 36 of a network node 18. One or more of the method steps may be performed in an order other than suggested by the illustration and it will be appreciated that the method 1200 can be repeated or otherwise performed on an ongoing basis with respect to individual receivers 12 and/or with respect to groups of receivers 12.

According to the reference numbering introduced in FIGS. 3 and 4, the method 1200 includes allocating (Block 1202) a first RU 50 to a first receiver 12-1 and a second RU 52 to a second receiver 12-2. The RUs 50 and 52 have the same subcarrier spacing but do not necessarily contain the same number of constituent subcarriers. The allocating step is performed for each of one or more OFDM symbol durations of an OFDM signal, and it will be appreciated that the allocating step may involve allocating both the first and second RUs 50 and 52 together in the same OFDM symbol duration(s), or may involve allocating the first and second RUs 50 and 52 in different OFDM symbol durations in mutually exclusive fashion.

The method 1200 further includes applying (Block 1204) a first mapping for mapping data to be transmitted to the first receiver 12-1, wherein the first mapping considers every subcarrier 54 of the first RU 52 as being available for mapping the data for the first receiver 12-1 to the first RU 52. Further, the method 1200 includes applying (Block 1206) a second mapping for mapping data to be transmitted to the second receiver 12-2, wherein the second mapping considers every m-th subcarrier 56 of the second RU 52 as being available for mapping the data for the second receiver 12-1 to the second RU 52. As before, m is an integer greater than or equal to two, and the second mapping maps zeros to the remaining subcarriers 58 of the second RU 52.

The method 1200 further includes generating (Block 1208) the OFDM signal from the mapped data for the first and second receivers 12-1, 12-2, where the OFDM signal comprises an OFDM symbol—i.e., over the OFDM carrier bandwidth—for each of the one or more OFDM symbol durations, and where each OFDM symbol having a commonly defined cyclic prefix length. Still further, the method 1200 includes transmitting (Block 1210) the generated OFDM signal. The steps 1208 and 1210 include generating and transmitting at least one OFDM symbol in a corresponding OFDM symbol time, but may include transmitting two or more OFDM symbols in respective OFDM symbols times.

Figure 13:
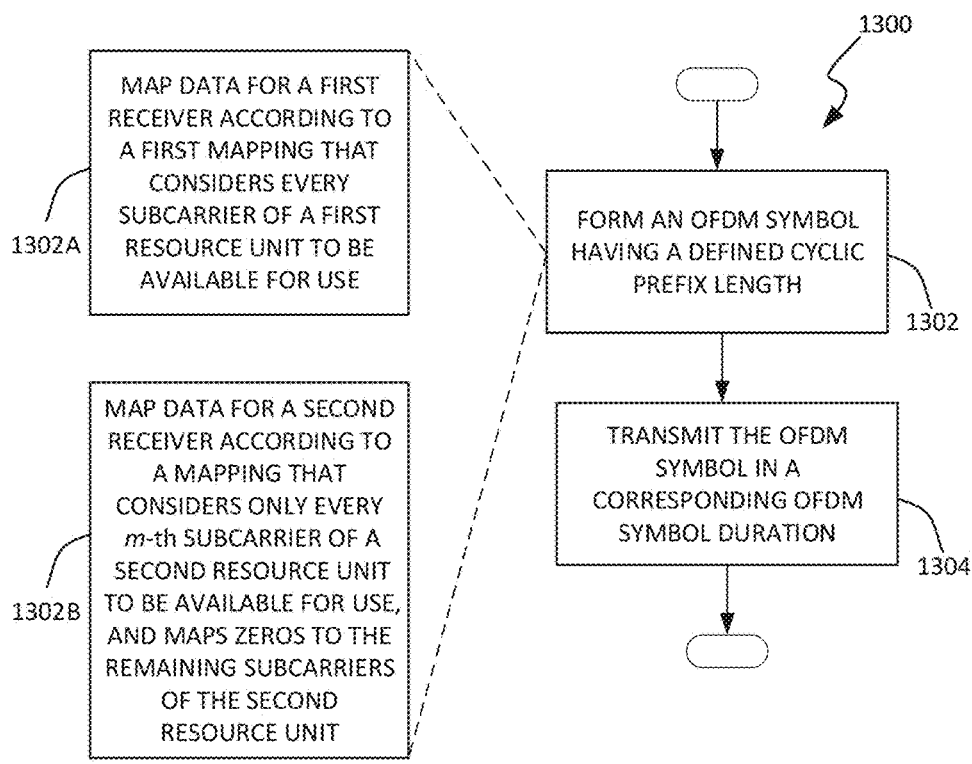
FIG. 13 is a logic flow diagram of another embodiment of a method of transmission in a wireless communication network.

FIG. 13 illustrates another method 1300 which may be implemented via the processing circuitry 36 of a network node 18. FIG. 13 may be regarded as an example case of the method 1200 where a first RU 50 within an OFDM symbol is allocated to a first receiver 12-1 and a second RU 52 within the same OFDM symbol is allocated to a second receiver 12-2. Here, the effective extension of the CP length of the OFDM symbol is not used for the first receiver 12-1 and is used for the second receiver 12-2.

The method 1300 includes forming an OFDM symbol having a defined CP length (Block 1302) and transmitting the OFDM symbol in a corresponding OFDM symbol duration (Block 1304). The forming operation includes mapping (Block 1302A) data for the first receiver 12-1 to the first RU 50, according to a first mapping that considers every subcarrier 54 of the first RU 50 to be available for use. The forming operation further includes mapping (Block 1302B) data for the second receiver 12-2 to the second RU 52, according to a second mapping that considers only every m-th subcarrier 56 of the second RU 52 to be available for use and maps zeros to the remaining subcarriers 58 in the second RU 52.

Figure 14:
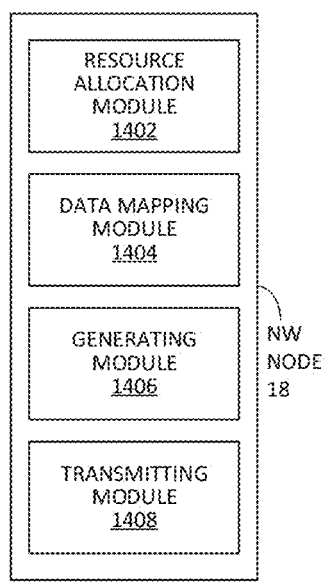
FIG. 14 is a block diagram of another embodiment of a network node.

FIG. 14 illustrates an embodiment of the network node 18 comprising processing modules, which may be realized at least functionally via the processing circuitry 36. The network node 18 includes a resource allocation module 1402 that is configured to allocate a first resource unit 50 to a first receiver 12-1 and a second resource unit 52 to a second receiver 12-2. Each resource unit 50 and 52 has same subcarrier spacing, and the allocating operations are performed for each of one or more Orthogonal Frequency Division Multiplexing (OFDM) symbol durations of an OFDM signal. For example, the two RUs 50 and 52 may be allocated together in each of one or more OFDM symbols. Alternatively, the first RU 50 is allocated in each of one or more first OFDM symbols, and the second RU 52 is allocated in each of one or more second OFDM symbols.

The network node 18 further includes a data mapping module 1404 that applies a first mapping for mapping data to be transmitted to the first receiver 12-1, where the first mapping considers every subcarrier 54 of the first RU 50 as being available for mapping the data for the first receiver 12-1 to the first resource unit 50. The data mapping module 1404 applies a second mapping for mapping data to be transmitted to the second receiver 12-2, where the second mapping considers every m-th subcarrier 56 of the second RU 52 as being available for mapping the data for the second receiver 12-2 to the second RU 52. The value m is an integer greater than or equal to two, and the second mapping maps zeros to the remaining subcarriers 58 of the RU 52.

Still further, the network node 18 includes a generating module 1406 that generates the OFDM signal from the mapped data for the first and second receivers 12-1, 12-2, the OFDM signal comprising an OFDM symbol for each of the one or more OFDM symbol durations involved in the described operations. Each such OFDM symbol has a commonly defined cyclic prefix length, and the network node 18 includes a transmitting module 1408 for transmitting the generated OFDM signal.

The preceding example embodiments illustrate various implementations for effectively increasing the CP length for some data transmissions within an OFDM symbol without increasing it for other data transmissions within the OFDM symbol. The approach allows for concurrent or mixed scheduling of receivers 12 having significantly different needs regarding CP length, all without changing the nominal OFDM signal structure and resource allocation scheme. For example, a first receiver 12-1 may be an 802.11ax type wireless communication device that needs only the CP commonly applied to OFDM symbols transmitted in the downlink while a second receiver 12-2 may be a LRLP type wireless communication device that need a potentially much longer CP length. The longer effective CP length provided to the second receiver 12-2 solve the problems associated with the longer ranges and/or lower powers associated with LRLP operation.

For example, by using every second subcarrier for an LRLP receiver, within the OFDM symbol duration used for 802.11ax receivers, the "signal" provided to an LRLP receiver can be understood as being generated by a FFT of half the size and then repeated twice (as compared to the "signal" provided to an 802.11ax receiver. By viewing the LRLP signal as repeated twice, the first half of the symbol can be viewed as an additional CP, thus significantly increasing the robustness to delays spread. The orthogonality towards the 802.11ax subcarriers within the same OFDM symbol duration is maintained by construction, as the signal for the LRLP receiver is generated by the same IFFT but with only half of the subcarriers allocated to it being used for data. However, if the LRLP reception were based on a FFT of half the size, the LRLP OFDM symbols will not be orthogonal to the 802.11ax OFDM symbols. To address this problem, a simple windowing function is used in the LRLP receiver, which ultimately restores the orthogonality completely. This windowing therefore substantially relaxes and even eliminates the requirements on the required filtering in the LRLP device before applying the FFT. In general, such configurations can be applied at any receiver 12 for which the effective extension of the CP length is in use.

The contemplated approach provides for efficient co-scheduled LRLP and 802.11ax OFDMA downlink transmissions. There is no additional cost introduced for 802.11ax receivers, such as would be the case if a longer CP were used for the OFDM symbols being transmitted. The proposed repetition used within the RUs allocated to LRLP receivers allows for a much longer channel and filtering in those receivers without causing ISI. This arrangement, therefore, eliminates the need for having a specific narrowband preamble in the downlink OFDM symbols, because the effective extension of the CP length for the transmissions to the LRLP receivers can be used for time synchronization.

Of course, the teachings disclosed herein apply to essentially any type of wireless communication network where OFDM symbols carry data for one or more full bandwidth devices and one or more reduced-bandwidth devices that process only a smaller part of the full bandwidth, e.g., a 2 MHz portion of a 20 MHz bandwidth. In an example case, a first receiver 12-1 is an 802.11ax STA and it processes a full bandwidth downlink signal, while a second receiver is a LRLP STA and it processes only a small portion of the full bandwidth downlink signal.

The OFDM symbols transmitted by the network node 18 may carry data for both receivers 12-1 and 12-2, with the first or default mapping being used for transmitting to the first receiver 12-1 and the second or modified mapping being used for transmitting to the second receiver 12-2. Notably, effectively extending the CP length for the data targeted to the second receiver 12-2 based on the every-m-th subcarrier mapping disclosed herein is transparent to the first receiver 12-1, which means that it can operate with no modifications.

FIG. 15 illustrates one embodiment of co-scheduling receivers 12 of the LRLP type along with receivers 12 of the 802.11ax type. OFDM symbol times 1 through N are illustrated and one sees that each OFDM symbol time includes transmissions for a number of 802.11ax receivers and includes transmissions for a number of LRLP receivers. One sees that the transmissions targeting the LRLP receivers are based on m=2, for a repetition factor of two. FIG. 16 illustrates a similar arrangement, but shows that some LRLP-targeted transmissions may use one value of m (repetition factor), while other LRLP-targeted transmissions within the same OFDM symbol time(s) may use a different value of m. Thus, the value of m may vary for different RUs and/or LRLP receivers 12 within the same OFDM symbol duration as seen in FIG. 16, and may vary over time for one and the same LRLP receiver 12 for RUs in different OFDM symbol durations (not shown).

As noted, using m=2 effectively halves the "length" of a transmission to the second receiver 12-2, which means that redundancy is introduced into the transmission and the CP length has been effectively extended by an amount equal to the "data" part of the transmission. Such effective extensions of the CP length can support propagation delays greatly exceeding that provided for by the nominal or normal CP length defined for 802.111ax receivers. Even longer extensions are obtained with m=3, etc., albeit at the expense of data throughput. Thus, the second mapping allows for a larger channel delay spread to be handled without suffering from ISI, as compared to the common cyclic prefix.

In an example embodiment, the RUs 50 and 52 each comprise twenty-six subcarriers within a given OFDM symbol duration, and the first receiver 12-1 is an 802.11ax STA and the second receiver 12-2 is an LRLP STA. The first mapping is used for mapping data for the 802.11ax STA to subcarriers 54 in the first RU 50, while the second mapping is used for mapping data for the LRLP STA to every m-th subcarrier 56 in the second RU 52, with zeros mapped to the remaining subcarriers 58 within the second RU 52. As seen in FIG. 15, RUs 50 and 52 may be within the same OFDM symbol duration.

With m=2 and 26 subcarriers per RU, only thirteen subcarriers 56 in the second RU 52 are available for data, with the remaining thirteen subcarriers 58 being zeroed. To keep the total power sent in the RU 52 constant, the available subcarriers 56 that are used for data transmission are transmitted with a 3 dB higher power. And, as noted, it is possible to also repeat the "signal" within the second RU 52 more than once, so that instead of the RU 52 containing two copies of the signal intended for the targeted receiver it contains three copies, four copies, etc. At the transmitter side, this may be implemented by inserting (m−1) zeros between each subcarrier used for data transmission.

In at least one embodiment, a given receiver 12 may be using a mix of RUs 50 and 52, i.e., some RUs may be transmitted using the first or normal mapping and some RUs may be transmitted to the receiver 12 using the second mapping, for effective extension of the CP length. In one example of such a scheme, the RUs corresponding to the first part of a packet are transmitted using the second mapping (CP extension), while the subsequent, remaining RUs of the packet are transmitted using the first mapping (no CP extension).

Similarly, the network node 18 may switch between using the first and second mappings for a given receiver 12 based on its observations of communication performance, or based on feedback from the receiver 12. Additionally, when the network node 18 is using the second mapping for the receiver 12, it may adjust the value of m based on monitoring communication performance or receiving feedback. Further, it is contemplated that at least some receivers 12 may explicitly indicate whether to use the first or second mapping and/or specify the value of m to be used for the second mapping.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of transmission performed by a network node in a wireless communication network, the method comprising:

allocating a first resource unit to a first receiver and a second resource unit to a second receiver, each resource unit having the same subcarrier spacing, said allocating performed with respect to one or more Orthogonal Frequency Division Multiplexing (OFDM) symbol durations of an OFDM signal;

applying a first mapping for mapping data to be transmitted to the first receiver, wherein the first mapping considers every subcarrier of the first resource unit as being available for mapping the data for the first receiver to the first resource unit;

applying a second mapping for mapping data to be transmitted to the second receiver, wherein the second mapping considers only every m-th subcarrier of the second resource unit as being available for mapping the data for the second receiver to the second resource unit, wherein m is an integer greater than or equal to two, and wherein the second mapping maps zeros to the remaining subcarriers of the second resource unit;

generating the OFDM signal from the mapped data for the first and second receivers, the OFDM signal comprising an OFDM symbol for each of the one or more OFDM symbol durations, each said OFDM symbol having a commonly defined cyclic prefix length; and transmitting the generated OFDM signal.

2. The method of claim 1, further comprising determining that the first mapping should be used for the first receiver based on determining that the first receiver belongs to a first category of receivers, and determining that the second mapping should be used for the second receiver based on determining that the second receiver belongs to a second category of receivers.

3. The method of claim 2, wherein determining that the first and second receivers belong to the first and second categories of receivers, respectively, comprises making the determinations from at least one of: receiver type indicators received from or for the first and second receivers, maximum transmit power levels of the first and second receivers, and distances of the first and second receivers relative to the network node, channel conditions of the first and second receiver relative to the network node, and one or more receiver capabilities or constraints known for the first or second receivers.

4. The method of any of claim 1, wherein the method comprises performing said steps of allocating, applying, generating, and transmitting as part of scheduling receivers of a first category and receivers of a second category, said first receiver belonging to the first category and said second receiver belonging to the second category, and further wherein the method includes one of:

scheduling one or more receivers belonging to the first category and one or more receivers belonging to the second category in the same OFDM symbol durations; and scheduling the one or more receivers belonging to the first category and the one or more receivers belonging to the second category in mutually exclusive OFDM symbol durations.

5. The method of claim 4, wherein scheduling the one or more receivers belonging to the first category and the one or more receivers belonging to the second category in mutually exclusive OFDM symbol durations comprises allocating first OFDM symbol durations for serving the one or more receivers belonging to the first category and allocating second OFDM symbol durations for serving the one or more receivers belonging to the second category.

6. The method of claim 5, further comprising determining the allocations of the first and second OFDM symbol durations in dependence on a communication load associated with the one or more receivers belonging to the first category, in relation to the communication load associated with the one or more receivers belonging to the second category.

7. The method of claim 1 wherein allocating the first and second resource units comprises allocating the first and second resource units in the same OFDM symbol duration.

8. The method of claim 1, wherein allocating the first and second resource units comprises allocating the first and second resource units in mutually exclusive OFDM symbol durations.

9. The method of claim 1 wherein the second mapping allows for a larger channel delay spread to be handled without suffering from Inter-Symbol Interference (ISI), as compared to the common cyclic prefix, for the data to be transmitted to the second receiver, and wherein the method comprises deciding to apply the second mapping for the data to be transmitted to the second receiver, instead of the first mapping, based on at least one of: channel conditions between the network node and the second receiver; and receiver type or capability information known for the second receiver.

10. The method of claim 1 wherein the value of m used in the second mapping is fixed.

11. The method of claim 1, wherein the value of m used in the second mapping is selected as a function of at least one of: channel conditions between the network node and the second receiver; and receiver type or capability information known for the second receiver.

12. The method of claim 1, wherein the first receiver is a first type of wireless device operating in the wireless communication network and the second receiver is a second type of wireless device operating in the wireless communication network.

13. A network node configured for operation in a wireless communication network, the network node comprising:

communication circuitry configured for transmitting to receivers operating in the wireless communication network; and processing circuitry operatively associated with the communication circuitry and configured to:

allocate a first resource unit to a first receiver and a second resource unit to a second receiver, each resource unit having the same subcarrier spacing, and said allocation performed with respect to one or more Orthogonal Frequency Division Multiplexing (OFDM) symbol durations of an OFDM signal;

apply a first mapping for mapping data to be transmitted to the first receiver, wherein the first mapping considers every subcarrier of the first resource unit to be available for use when mapping the data for the first receiver to the first resource unit;

apply a second mapping for mapping data to be transmitted to the second receiver, wherein the second mapping considers only every m-th subcarrier of the second resource unit to be available for use when mapping data for the second receiver to the second resource unit, wherein m is an integer greater than or equal to two, and wherein the second mapping maps zeros to the remaining subcarriers of the second resource unit;

generate the OFDM signal from the mapped data for the first and second receivers, the OFDM signal comprising an OFDM symbol for each of the one or more OFDM symbol durations, each said OFDM symbol having a commonly defined cyclic prefix length; and transmit the generated OFDM signal.

14. The network node of claim 13, wherein the processing circuitry is configured to determine that the first mapping should be used for the first receiver based on determining that the first receiver belongs to a first category of receivers, and determine that the second mapping should be used for the second receiver based on determining that the second receiver belongs to a second category of receivers.

15. The network node of claim 14, wherein the processing circuitry is configured to determine that the first and second receivers belong to the first and second categories of receivers, respectively, by making the determinations from at least one of: receiver type indicators received from or for the first and second receivers, maximum transmit power levels of the first and second receivers, distances of the first and second receivers relative to the network node, channel conditions of the first and second receiver relative to the network node, and one or more receiver capabilities or constraints known for the first or second receivers.

16. The network node of claim 13, wherein the processing circuitry is configured to perform the allocating, applying, generating, and transmitting operations as part of scheduling receivers of a first category and receivers of a second category, said first receiver belonging to the first category and said second receiver belonging to the second category, and wherein the processing circuitry is configured to perform one of the following operations:
    schedule one or more receivers belonging to the first category and one or more receivers belonging to the second category in the same OFDM symbol durations; and
    schedule the one or more receivers belonging to the first category and the one or more receivers belonging to the second category in mutually exclusive OFDM symbol durations.

17. The network node of claim 16, wherein the processing circuitry is configured to schedule the one or more receivers belonging to the first category and the one or more receivers belonging to the second category in mutually exclusive OFDM symbol durations, by being configured to allocate first OFDM symbol durations for serving the one or more receivers belonging to the first category and allocate second OFDM symbol durations for serving the one or more receivers belonging to the second category.

18. The network node of claim 17, wherein the processing circuitry is configured to determine the allocations of the first and second OFDM symbol durations in dependence on a communication load associated with the one or more receivers belonging to the first category, in relation to the communication load associated with the one or more receivers belonging to the second category.

19. The network node of claim 13, wherein the processing circuitry is configured to allocate the first and second resource units in the same OFDM symbol duration.

20. The network node claim 13, wherein the processing circuitry is configured to allocate the first and second resource units in mutually exclusive OFDM symbol durations.

21. The network node of claim 13, wherein the second mapping allows for a larger channel delay spread to be handled without suffering from Inter-Symbol Interference (ISI), as compared to the common cyclic prefix, for the data to be transmitted to the second receiver, and wherein the processing circuitry is configured to decide to apply the second mapping for the data to be transmitted to the second receiver, instead of the first mapping, based on at least one of:
    channel conditions between the network node and the second receiver; and
    receiver type or capability information known for the second receiver.

22. The network node of claim 13, wherein the processing circuitry is configured to use a fixed value of m in the second mapping.

23. The network node of claim 13, wherein the processing circuitry is configured to select the value of m in the second mapping as a function of at least one of:
    channel conditions between the network node and the second receiver; and
    receiver type or capability information known for the second receiver.

24. The network node of claim 13, wherein the first receiver is a first type of wireless device operating in the wireless communication network and the second receiver is a second type of wireless device operating in the wireless communication network.

25. A method of transmission performed by a network node in a wireless communication network, the method comprising:
    forming an OFDM symbol having a defined cyclic prefix length; and
    transmitting the OFDM symbol in a corresponding OFDM symbol duration;
    wherein said forming comprises:
        mapping data for a first receiver to a first resource unit allocated to the first receiver for the OFDM symbol duration, wherein the first mapping considers every subcarrier of the first resource unit as being available for use when mapping the data for the first receiver to the first resource unit;
        mapping data for a second receiver to a second resource unit allocated to the second receiver for the OFDM symbol duration, wherein the second mapping considers only every m-th subcarrier of the second resource unit as being available for use when mapping the data for the second receiver to the second resource unit, and maps zeros to the remaining subcarriers of the second resource unit, wherein m is an integer greater than or equal to two;
        wherein the first and second resource units have the same subcarrier spacing.

26. A non-transitory computer-readable medium comprising computer code that, when executed by processing circuitry of a network node operating in a wireless communication network, causes the network node to:
    allocate a first resource unit to a first receiver and a second resource unit to a second receiver, each resource unit having the same subcarrier spacing, said allocating performed with respect to one or more Orthogonal Frequency Division Multiplexing (OFDM) symbol durations of an OFDM signal;
    apply a first mapping for mapping data to be transmitted to the first receiver, wherein the first mapping considers every subcarrier of the first resource unit as being available for mapping the data for the first receiver to the first resource unit;
    apply a second mapping for mapping data to be transmitted to the second receiver, wherein the second mapping considers only every m-th subcarrier of the second resource unit as being available for mapping the data for the second receiver to the second resource unit, wherein m is an integer greater than or equal to two, and wherein the second mapping maps zeros to the remaining subcarriers of the second resource unit;
    generate the OFDM signal from the mapped data for the first and second receivers, the OFDM signal comprising an OFDM symbol for each of the one or more OFDM symbol durations, each said OFDM symbol having a commonly defined cyclic prefix length; and
transmit the generated OFDM signal.

* * * * *

UNITED STATES PATENT AND TRADEMARK OFFICE
CERTIFICATE OF CORRECTION

PATENT NO. : 9,838,173 B1  
APPLICATION NO. : 15/369307  
DATED : December 5, 2017  
INVENTOR(S) : Nilsson et al.

Page 1 of 1

It is certified that error appears in the above-identified patent and that said Letters Patent is hereby corrected as shown below:

In the Specification

In Column 1, Line 43, delete ""RU."" and insert -- "RU," --, therefor.

In Column 2, Line 2, delete "802.111ax" and insert -- 802.11ax --, therefor.

In Column 2, Line 51, delete "in is" and insert -- m is --, therefor.

In Column 4, Line 51, delete "12." and insert -- 12, --, therefor.

In Column 7, Line 2, delete "includes." and insert -- includes, --, therefor.

In Column 8, Line 24, delete "terms." and insert -- terms, --, therefor.

In Column 9, Lines 63-64, delete "modulation circuit 80" and insert -- modulation circuit 70 --, therefor.

In Column 9, Line 66, delete "modulation circuit 80" and insert -- modulation circuit 70 --, therefor.

In Column 10, Line 44, delete "network node 10." and insert -- network node 18. --, therefor.

In Column 13, Line 63, delete "802.111ax" and insert -- 802.11ax --, therefor.

In the Claims

In Column 15, Line 38, in Claim 4, delete "of any of" and insert -- of --, therefor.

In Column 17, Line 51, in Claim 20, delete "node" and insert -- node of --, therefor.

Signed and Sealed this  
Twenty-second Day of May, 2018

Andrei Iancu  
*Director of the United States Patent and Trademark Office*